UNITED STATES PATENT OFFICE.

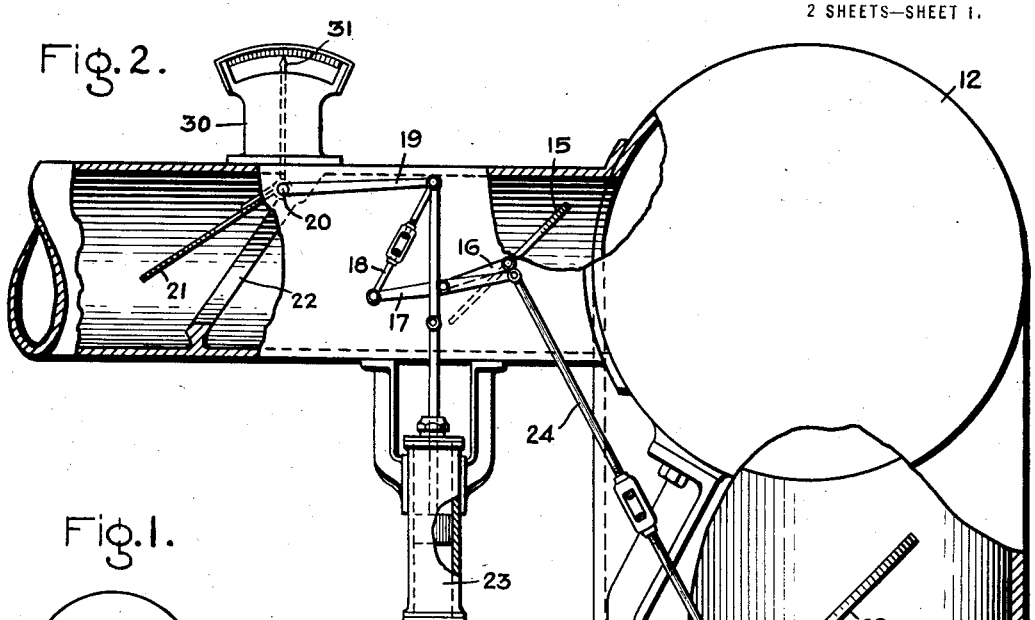
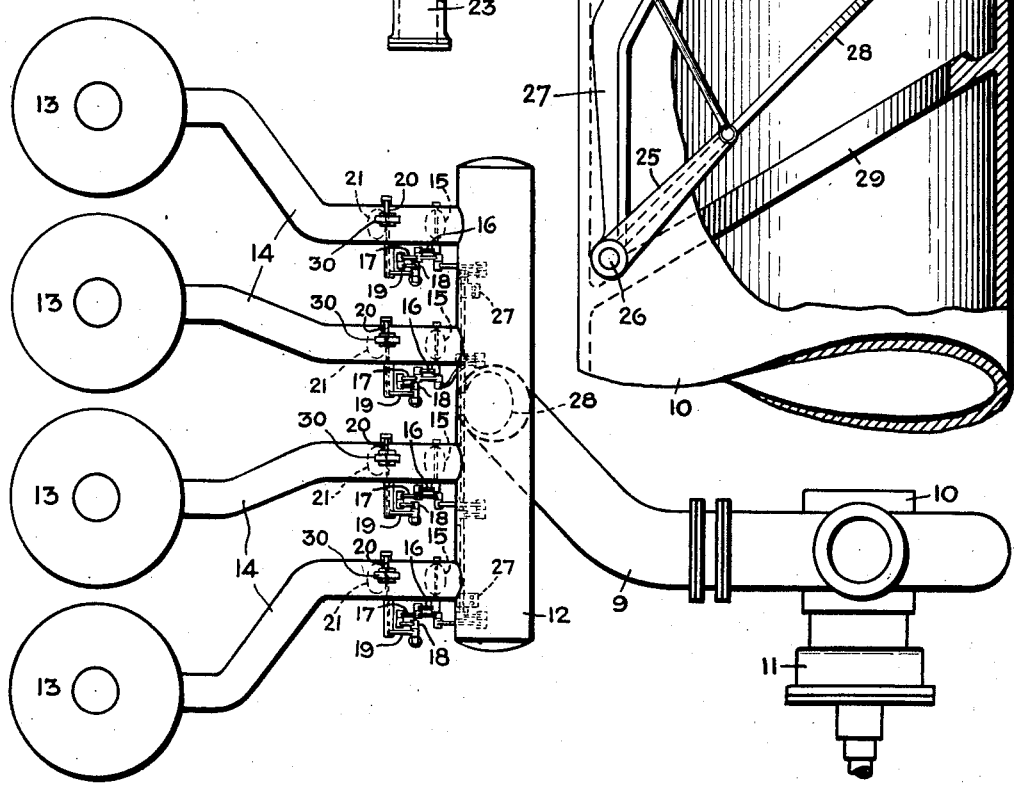

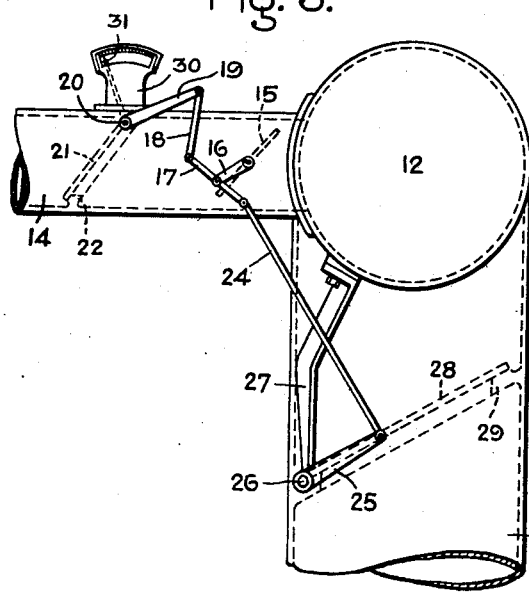
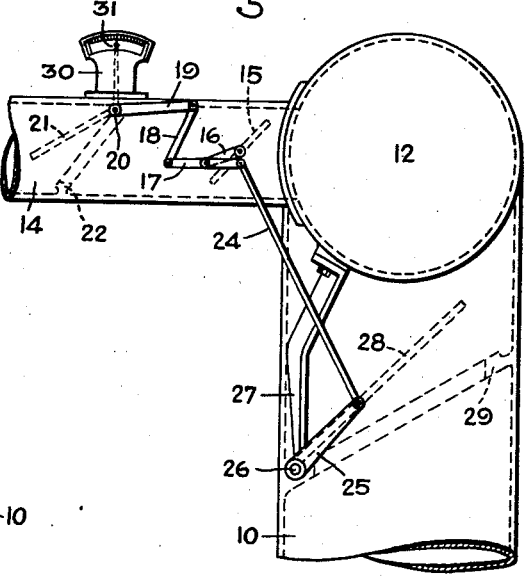
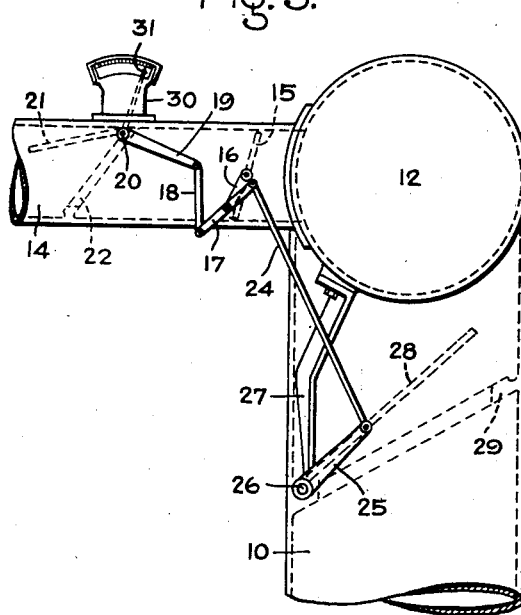
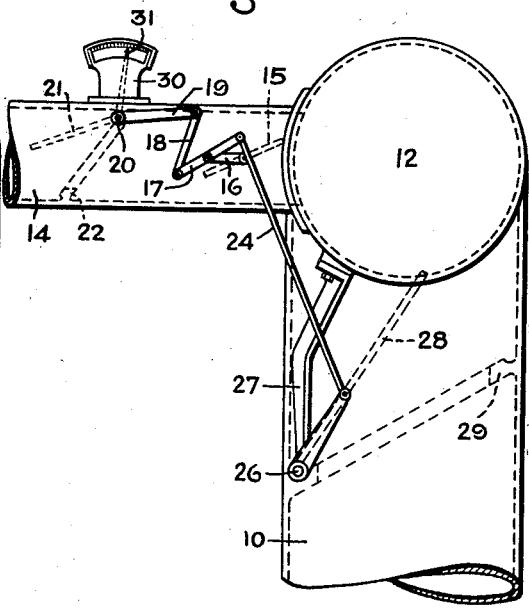

JOHN G. CALLAN, OF BOSTON, MASSACHUSETTS, ASSIGNOR TO GENERAL ELECTRIC COMPANY, A CORPORATION OF NEW YORK.

REGULATING MECHANISM FOR CONTROLLING THE FLOW OF FLUIDS.

1,177,480.

Specification of Letters Patent.

Patented Mar. 28, 1916.

Application filed January 21, 1915. Serial No. 3,625.

*To all whom it may concern:*

Be it known that I, JOHN G. CALLAN, a citizen of the United States, residing at Boston, county of Suffolk, State of Massachusetts, have invented certain new and useful Improvements in Regulating Mechanism for Controlling the Flow of Fluids, of which the following is a specification.

The present invention relates to regulating mechanism for controlling the flow of a fluid, as air, from a common main or header through a plurality of conduits connected in parallel thereto, and has for its object to provide an improved arrangement which will insure an equal or other desired distribution of the volume of fluid among the several branch conduits irrespective of the total volume flowing or the resistance to the flow offered by the individual branches.

One application of my invention is in connection with gas producer plants wherein a number of gas producers are fed with air by branch blast pipes connected in parallel to a common blast main. In such a plant no two fires have the same fuel bed resistance, and since the aggregate amount of air delivered to the bank of producers is a definite quantity fixed by and varying with the requirements of the consumption apparatus, as the engine or metallurgical process, it follows that the fire with the lowest fuel bed resistance will tend to take the most air. This means that it will burn out its fuel more rapidly thus further decreasing its resistance and causing it to draw still more air so that conditions go from bad to worse. Since the total quantity of air is fixed at any one time if one producer takes an excessive amount of air, it reduces by just that amount the supply delivered to the rest of the producers.

My invention when applied to a gas producer plant remedies these conditions by providing automatic means which will insure the equal volumetric division of the air among the respective producers irrespective of their relative resistance and of the total volume of the air.

In carrying out my invention I provide a suitable valve or damper in each branch conduit for checking the flow of fluid through it and control the position of each valve or damper in accordance with the flow through its branch conduit. In addition to this I modify or control the position of all the valves or dampers in accordance with the total volumetric flow.

Referring to the accompanying drawing wherein I have illustrated my invention in connection with a gas producer plant, Figure 1 is a diagrammatic plan view of a portion of a gas producer plant to which my invention has been applied. Fig. 2 is a view illustrating my invention, certain parts being broken away so as to more clearly show others; and Figs. 3 to 6 are diagrammatic views similar to Fig. 2 showing different relative positions which the respective parts assume under different conditions of operation.

9 indicates a main blast conduit receiving air from a suitable source, as a centrifugal compressor 10 driven by the turbine 11, and delivering it to the header or manifold 12. The turbo-compressor set may be regulated in any suitable manner so as to deliver the desired quantity of air or to maintain a suitable pressure.

13 indicates a bank of gas producers connected in parallel to the manifold 12 by branch blast pipes 14. Arranged in each branch blast pipe 14 is a valve or damper 15 which controls the flow of air through it. Each of these dampers is controlled as follows: Connected to the damper is an operating arm 16, the outer end of which is pivotally connected to a floating lever 17 at a point between its ends. One end of the floating lever is connected by a link 18 to an arm 19 fixed on the shaft 20. The link 18 is preferably made adjustable. The shaft 20 is suitably pivoted in and adjacent to the top of the branch blast pipe and carries a vane 21 which is moved by the air flowing through the pipe. At no flow the vane will rest against its seat 22. When air is flowing through the conduit it will be moved from its seat an amount proportional to the quantity of flow. The arm 19 is connected with a suitable dash pot 23 in order to dampen the movements of the vane. The other end of the floating lever 17 is connected by an adjustable rod 24 to an arm 25 carried by a shaft 26. This shaft 26 extends lengthwise of the manifold 12 as best shown in Fig. 2 and is common to all the arms 25. It is pivotally supported by the brackets 27. The shaft 26 is arranged to be oscillated by a vane 28 arranged in the main blast conduit 9. The shaft is preferably arranged to pass through the conduit near the outer portion and to have the vane fixed directly to it. With no flow through the conduit the vane 28 will rest by gravity on the seat 29 and it will be moved from the seat when air is flowing by an amount proportional to the quantity of flow. 30 are suitable indicators having their pointers 31 connected to the vanes 21 so as to indicate their movements.

The operation is as follows, reference being had particularly to Figs. 3 to 6. With no flow through the conduits, the parts will assume the positions shown in Fig. 3. The vanes 21 and 28 will rest by gravity on their seats 22 and 29 and the dampers 15 will occupy an intermediate partially open position. If now the flow starts the vanes will all be lifted from their seats an amount proportional to the quantity of flow and will operate to position the dampers 15. Assuming for the instant, that the vanes 21 remain stationary, an opening movement of vane 28 will turn shaft 26 in an anti-clockwise direction and through arms 25, rods 24, floating lever 17 and arms 16 will move all the dampers in a direction to open them. During this movement the floating levers 17 pivot on the links 18 which will be stationary since vanes 21 were assumed to be stationary. From this it will be seen that an increase in flow through the main blast conduit tends to open all the dampers 15 by the same amount. In like manner, a decrease in flow will tend to close them.

Assuming now that the vane 28 remains stationary, a movement of any one of the vanes 21 in a direction away from its seat, which means an increase in the flow through that particular pipe, will turn the shaft 20 to which it is attached in a clockwise direction. This moves arm 19 in a like direction and through link 18 and floating lever 17 turns the damper 15 in a direction to close it. During this movement the floating lever 17 pivots on the end of the rod 24. That is an increase in flow in any branch blast pipe, tends to close the damper therein. In a similar manner a decrease in flow in any branch pipe tends to open the damper therein.

Fig. 4 shows the relative positions which the parts in the main blast conduit and one of the branches may assume under one condition of flow. The vane 28 is held from its seat to a certain extent due to the flow through the main blast conduit and the vane 21 is held from its seat to a certain extent due to the flow through the branch in which it is located. The damper 15 occupies a partially open position. It will be noted that it is substantially the same position as in Fig. 3 where both vanes are against their seats. This is due to the fact that while the movement of the vane 28 was in a direction to open the damper, the movement of the vane 21 was in a direction to close it; the resultant of the two movements left the damper in substantially the same position. It will be understood, of course, that the dampers in the different branches will assume different positions, depending on the resistance offered to the flow. For example, Fig. 5 shows an extreme condition in which a branch conduit, due to its low resistance to air flow, has tended to take an excessive quantity of the flow. This has resulted in its vane 21 moving to the position shown and in the damper 15 being substantially closed.

In Fig. 6 is illustrated a condition in which the flow through the main blast conduit and hence that through each of the branches has materially increased over that shown in Fig. 4. The vane 28 has accordingly moved to open further all the dampers 15. At the same time, the vanes 21 have been moved due to the increased flow, but in a direction to close the dampers 15. The resultant of the two movements has in each instance been just sufficient to open the respective dampers by amounts which insure that each branch will take its share of the increased flow. For the branches offering the greater resistance to the flow, the opening will needs be greater, while for those offering lesser resistance to the flow the opening will be less. Should the branches happen to offer each exactly the same resistance, then the movements would in each instance be the same. This is a condition, however, which would seldom, if ever, be met with.

While I have particularly described my invention as being applied to a gas producer plant for regulating the supply of air to the respective producers, it will be understood that it is not limited to this particular application or to controlling air flow, as it may be applied whenever a similar condition exists in connection with which it would be useful, and for controlling any fluid. It will also be understood that in lieu of vanes I may use other means which will respond to the flow of the fluid through the respective conduits.

In accordance with the provisions of the patent statutes, I have described the principle of operation of my invention, together with the apparatus which I now consider to represent the best embodiment thereof, but I desire to have it understood that the apparatus shown is only illustrative, and that the invention can be carried out by other means.

What I claim as new and desire to secure by Letters Patent of the United States, is:—

1. In combination, a main conduit through which a fluid flows, a plurality of branch conduits adapted to receive fluid from the main conduit, a damper in one of the branch conduits, and means responsive to the flow in such branch conduit and to flow in the main conduit for controlling said damper.

2. In combination, a main conduit through which a fluid flows, a plurality of branch conduits adapted to receive fluid from the main conduit, a damper in each branch conduit, and means responsive to the flow in each branch conduit and to the flow in the main conduit for controlling said dampers.

3. In combination, a main conduit through which a fluid flows, a plurality of branch conduits connected in parallel thereto, a damper in each branch conduit, means associated with each branch conduit and operated by the flow therethrough which acts on the damper therein and tends to close it with increase in the flow, and means associated with the main conduit and operated by the flow therethrough which acts on all the dampers to open them with an increase in flow in the main conduit.

4. In combination, a main conduit through which a fluid flows, a plurality of branch conduits connected in parallel thereto, a damper in each branch conduit, a vane in each of the branch conduits and operated by the flow therethrough for controlling the damper therein, and a vane in the main conduit which acts on all the dampers.

5. In a gas producer plant, the combination of a plurality of producers, a main blast conduit, branch blast pipes connecting it to the producers, a damper in each branch pipe, and means responsive to the flow through the branch blast pipes and to the flow through the main conduit for regulating said dampers so as to distribute the flow among the branch pipes in a predetermined proportion.

6. In combination, a main conduit through which a fluid flows, a plurality of branch conduits connected thereto in parallel and adapted to receive fluid therefrom, a vane in the main conduit, a vane in each branch conduit, a damper in each branch conduit, a floating lever connected to each damper, and means connecting each floating lever to the vane in the conduit in which the damper to which it is connected is located and to the vane in the main conduit.

7. In combination, a main conduit through which a fluid flows, a plurality of branch conduits connected thereto to receive fluid therefrom in parallel, valve mechanism in each branch conduit, and means responsive to the total flow through the main conduit and to the flow through each individual conduit for regulating the valve mechanism therein.

8. In a gas producer plant comprising a plurality of producer units, the combination of a main blast conduit, branch pipes connecting it to the producer units, and means in the branch pipes controlled by the total flow through the main blast conduit and by the flow through the individual pipes for regulating said means to produce a predetermined distribution of the flow through the pipes.

In witness whereof, I have hereunto set my hand this eighteenth day of January, 1915.

JOHN G. CALLAN.

Witnesses:
 SUSAN M. CALKIN,
 HARRY S. THORT.